US011429205B2

(12) United States Patent
Short et al.

(10) Patent No.: US 11,429,205 B2
(45) Date of Patent: Aug. 30, 2022

(54) TIP-SWITCH AND MANUAL SWITCH TO OVERRIDE THE TIP-SWITCH FOR A STYLUS

(71) Applicant: Hewlett-Packard Development Company, L.P., Spring, TX (US)

(72) Inventors: David Bradley Short, San Diego, CA (US); Jinman Kang, San Diego, CA (US); Ben Wynne, San Diego, CA (US); Jamie Etcheson, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 440 days.

(21) Appl. No.: 15/500,564

(22) PCT Filed: Jul. 31, 2014

(86) PCT No.: PCT/US2014/049269
§ 371 (c)(1),
(2) Date: Jan. 31, 2017

(87) PCT Pub. No.: WO2016/018403
PCT Pub. Date: Feb. 4, 2016

(65) Prior Publication Data
US 2017/0228053 A1    Aug. 10, 2017

(51) Int. Cl.
*G06F 3/0354* (2013.01)
*G06F 3/0346* (2013.01)
(Continued)

(52) U.S. Cl.
CPC .......... *G06F 3/03545* (2013.01); *G06F 3/038* (2013.01); *G06F 3/0346* (2013.01);
(Continued)

(58) Field of Classification Search
CPC .. G06F 3/03545; G06F 3/0325; G06F 3/0416; G06F 3/041; G06F 3/038;
(Continued)

(56) References Cited

U.S. PATENT DOCUMENTS 5,548,092 A    8/1996    Shriver
5,717,435 A *  2/1998    Fukushima ......... G06F 3/03545
                                                         345/179

(Continued)

FOREIGN PATENT DOCUMENTS

CN    102339162    2/2012
CN    102576274    7/2012
(Continued)

OTHER PUBLICATIONS

Anonymous: "Microsoft Addresses N-Trig Concerns in Reddit Response—Surface Pro Artist", May 27, 2014 (May 27, 2014), XP855431356, Retrieved from the Internet: URL: ht tp: //surfaceproart i st. corn/bl og/2014/5/27/mi crosoft-addresses-n-tri g-concerns-i n-reddit-response [retrieved on Dec. 4, 2017].

(Continued)

*Primary Examiner* — David D Davis
(74) *Attorney, Agent, or Firm* — Fabian VanCott (57) ABSTRACT

A stylus having an applied force-sensitive tip-switch is disclosed. The stylus includes a tip-switch responsive to a variable applied force. Control circuitry determines whether the tip-switch has made contact with an object and, if so, the magnitude of the applied force resulting from the contact. The circuitry then encodes a signal that varies with the magnitude of the applied force and transmits the encoded signal to a computing device, enabling the computing device to indicate the two- or three-dimensional path of the tip-switch in the stylus on a computer screen. The circuitry also monitors a manual override switch that activates an encoded (Continued)

override signal for interpretation and use by the computing device while indicating the path of the tip switch on a computer screen.

20 Claims, 6 Drawing Sheets (51) Int. Cl.
*G06F 3/038* (2013.01)
*G06F 3/041* (2006.01)
*G06F 3/044* (2006.01)

(52) U.S. Cl.
CPC .......... *G06F 3/0383* (2013.01); *G06F 3/0442* (2019.05); *G06F 3/04162* (2019.05)

(58) Field of Classification Search
CPC .... G06F 3/0354; G06F 3/0346; G06F 3/0383; G06F 3/04162; G06F 3/0442
See application file for complete search history.

(56) References Cited

U.S. PATENT DOCUMENTS

| | | | |
|---|---|---|---|
| 5,914,708 A * | 6/1999 | LaGrange | G06F 3/03545 178/18.06 |
| 6,252,182 B1 | 6/2001 | Lai | |
| 7,232,271 B2 * | 6/2007 | Adams | B43K 8/22 401/116 |
| 7,599,561 B2 | 10/2009 | Wilson et al. | |
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,736,583 B2 | 5/2014 | Anderson et al. | |
| 2004/0008189 A1 * | 1/2004 | Clapper | G06F 3/03545 345/179 |
| 2004/0140963 A1 * | 7/2004 | Kim | G06F 3/0325 345/179 |
| 2004/0239652 A1 | 12/2004 | Tayor et al. | |
| 2005/0078092 A1 | 4/2005 | Clapper | |
| 2008/0018591 A1 | 1/2008 | Pittel et al. | |
| 2009/0273585 A1 * | 11/2009 | De Haan | G06F 3/03545 345/179 |
| 2010/0051356 A1 * | 3/2010 | Stern | G06F 3/03545 178/19.04 |
| 2010/0155153 A1 * | 6/2010 | Zachut | G06F 3/03545 178/18.03 |
| 2011/0006982 A1 * | 1/2011 | Rhee | G06F 3/03545 345/157 |
| 2011/0242054 A1 | 10/2011 | Tsu | |
| 2012/0068964 A1 | 3/2012 | Wright et al. | |
| 2012/0146958 A1 * | 6/2012 | Oda | G06F 3/0442 345/179 |
| 2012/0154340 A1 * | 6/2012 | Vuppu | G06F 3/0441 345/179 |
| 2012/0327040 A1 * | 12/2012 | Simon | G06F 3/0442 345/179 |
| 2013/0077236 A1 | 3/2013 | Becze et al. | |
| 2013/0271431 A1 | 10/2013 | Besperstov | |
| 2014/0028634 A1 | 1/2014 | Krah et al. | |
| 2014/0043289 A1 | 2/2014 | Stern | |
| 2015/0116289 A1 * | 4/2015 | Stern | G06F 3/03545 345/179 |
| 2015/0261343 A1 * | 9/2015 | Leigh | G06F 3/0446 345/173 |

FOREIGN PATENT DOCUMENTS

| | | | | |
|---|---|---|---|---|
| EP | 2407863 | | 1/2012 | |
| JP | 06202788 | | 7/1994 | |
| WO | WO-2012039837 | | 3/2012 | |
| WO | WO-2013/049286 A1 | | 4/2013 | |
| WO | WO-2013/153551 A1 | | 10/2013 | |
| WO | WO-2013/160887 A1 | | 10/2013 | |
| WO | WO 2013160887 A1 * | | 10/2013 | ......... G06F 3/03545 |

OTHER PUBLICATIONS

Mellow, "Pressure Sensitive Painting Comes to the iPad—review," Scientific American, Jan. 30, 2014, pp. 1-7.

Shahram Izadi et al., "C-Slate: A Multi-Touch and Object Recognition System for Remote Collaboration using Horizontal Surfaces,", 2007, pp. 3-10, IEEE.

* cited by examiner

TIP-SWITCH AND MANUAL SWITCH TO OVERRIDE THE TIP-SWITCH FOR A STYLUS

BACKGROUND

Stylus devices are used to interact with and convey information to computing devices. For example, a stylus may be used to draw lines on a computer screen or activate a user interface, such a graphical user interface (GUI), that is part of a computing system or workstation. One challenge associated with the use of a stylus concerns accurate identification of the position of the stylus tip or nib. This becomes particularly apparent when the stylus is used in a three-dimensional space, rather than simply a two dimensional space where a stylus is often used in conjunction with a touch pad. This becomes further apparent when a user desires to annotate in open three-space, where there is no object to touch for activating the stylus. These challenges and others are described in detail below in light of the principles of the present invention.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

The examples shown in the figures and described below illustrate, but do not limit, the invention, which is defined in the Claims following the below Description.

In the following description, for purposes of explanation, numerous specific details are set forth in order to provide a thorough understanding of the present systems, and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may at be included in other examples.

Figure 1:
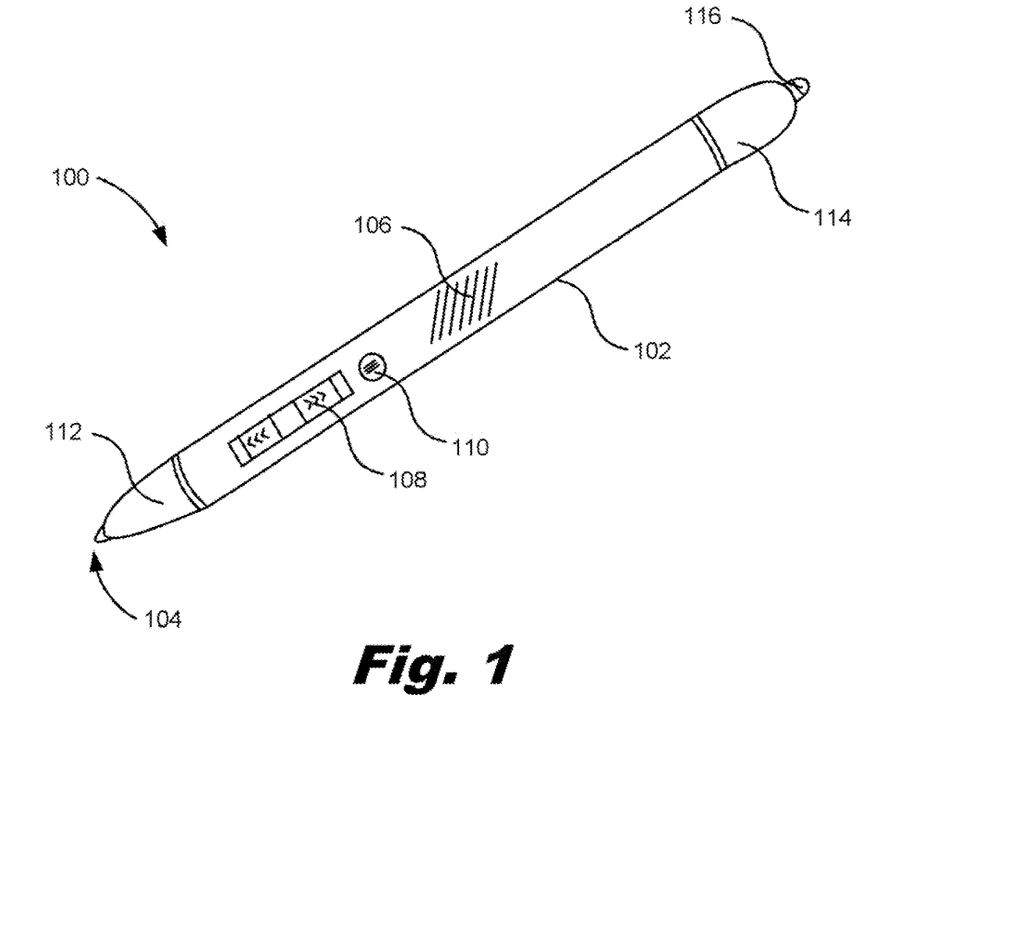
FIG. 1 is a perspective view of one example of the present invention, illustrating a housing, tip switch, manual override button and LED override indicator according to one example of the principles described herein.

Referring to FIG. 1, a stylus (100) is illustrated having aspects of the present invention. The stylus (100) includes a housing (102) and a tip-switch (104). The housing (102) may include a retro reflective coating (106) over a portion of the housing (102) or, in an alternative example, the retroreflective coating may completely cover the outer surface of the housing (102). The stylus (100) may further include a manual switch (108) and an indicator light (110). In one example, the indicator light (110) is an LED and is used to indicate when the manual switch (108) is closed or activated. As illustrated in FIG. 1, the stylus (100) or, alternatively, the housing (102) are generally cylindrical in cross section and elongate over its length, having the shape of a pen or pencil used for writing. It is appreciated, however, that other shapes, such as square or hexagonal cross sections may be employed. The housing (102) may also include a first end (112) and a second end (114) having tapered shapes starting, for example, from the cylindrical cross section of the housing and tapering to a relatively smaller cross section where the tip-switch (104) is positioned. Alternative examples of the present invention may include a second tip (116) at the second end (114) of the stylus (100) or housing (102). The second tip (116) may, in some examples, have tip-switch capabilities, as described further below.

Figure 2:
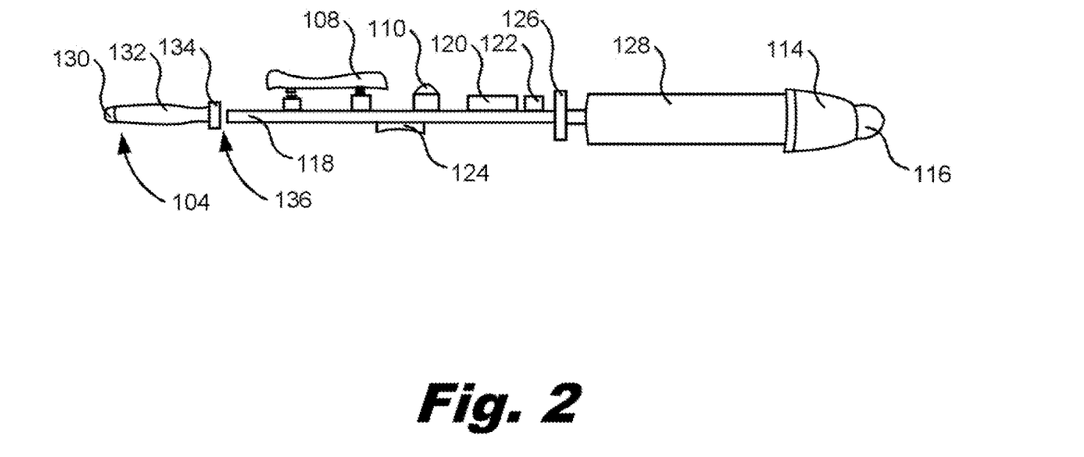
FIG. 2 is, a cutaway side view of the example illustrated in FIG. 1, illustrating various components of the inventive stylus according to one example of the principles described herein.

Referring now to FIG. 2, a cross sectional cutaway view of the stylus (100) described above is illustrated. Internal components of the stylus (100) may include a printed circuit board (PCB) (118), which itself includes mounted thereon the manual switch (108) and indicator light (110). In addition, the PCB (118) includes a control unit or circuitry (120) and a radio frequency transmitter (122). The transmitter (122) communicates data from the stylus (100) to a computing device (not illustrated) over a wireless radio frequency link. Alternatively, the wireless link may be replaced with a wired link between the stylus (100) and the computing device. The PCB (118) may also include an accelerometer (124), which may detect fine movement of the stylus (100) in two- or three-dimensions. Still referring to FIG. 2, the stylus (100) may include a magnet (126) for mounting the stylus (100) against a metallic structure such as, for example, a metallic portion of a the housing of a computing device. The internal componentry of the stylus (100) may also include a battery (128) for supplying power. Alternatively, power may be supplied by a wire extending between the stylus (100) and a computing device.

Still referring to FIG. 2, the stylus (100) includes, as indicated above, a tip-switch (104). The tip-switch (104) includes, in one example, a tip portion (sometimes referred to as a "nib") (130) used for drawing or writing on a computing device. The tip-switch (104) further includes a shaft portion (132) and an electrical contact portion (134). The shaft portion (132) or electrical contact portion (134) or both have load or force sensing capabilities for detecting the magnitude of the load placed on the tip portion (130) during writing or drawing. For example, the load sensing portions may comprise piezoelectric materials that alter electrical resistance based on the load experienced during drawing or writing. The change in resistance can be used by the control unit or circuitry (120) to determine the magnitude of the load. Alternative examples of load sensing materials or devices include capacitive sensors or simple strain gauges. The contact portion (134) of the tip-switch (104) may be spaced a short distance (136) from the end of the PCB (118) and biased, in one example, away from the PCB (118) by a spring (not illustrated). Biasing the contact portion (134) away from the PCB (118) in such fashion better ensures that spurious loads or noise from the tip-switch is not detected by the control unit or circuitry when the stylus (100) is not being used to write or draw.

Figure 3:
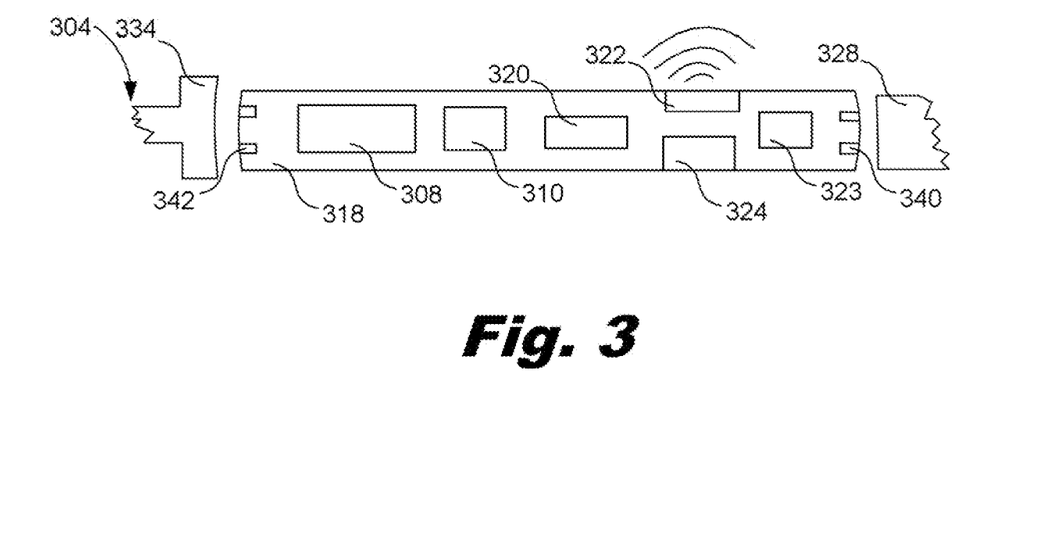
FIG. 3 is an overhead view of a printed circuit board and various component circuitry used in one example of the inventive stylus according to one example of the principles described herein.

Referring now to FIG. 3, a second or overhead view of one example of a PCB (318) having the components just described is illustrated in conceptual manner. In this example, the PCB (318) includes manual switch circuitry (308) and indicator light circuitry (310). The PCB (318) may further include circuitry for a control unit (320), transmitter (322) and accelerometer (324). Depending on the power requirements of the components on the PCB (318), a boost converter (323) may also be employed. The illustrative PCB (318) also includes power source contacts (340) for establishing electrical connection with, for example, a battery power source (328) (shown in partial view). The PCB (318) further includes tip-switch contacts (342) for establishing electrical connection with a contact portion (334) of an illustrative tip-switch (304) (shown in partial view).

The illustrative PCB (318) (and PCB (118) shown in FIG. 2) can be laid out and constructed using readily available components and techniques. The basic componentry in one such example includes a Texas Instruments CC2540 BLE SoC for the control circuitry and transmitter and an Analog Devices ADXL362 3-axis accelerometer. The SoC and accelerometer may be connected using a serial peripheral interface protocol. The manual switch and indicator components may be connected to the SoC using general purpose input/output pins. Power to the SoC can be supplied using the Vcc input received from the battery or boost converter.

Figure 4:
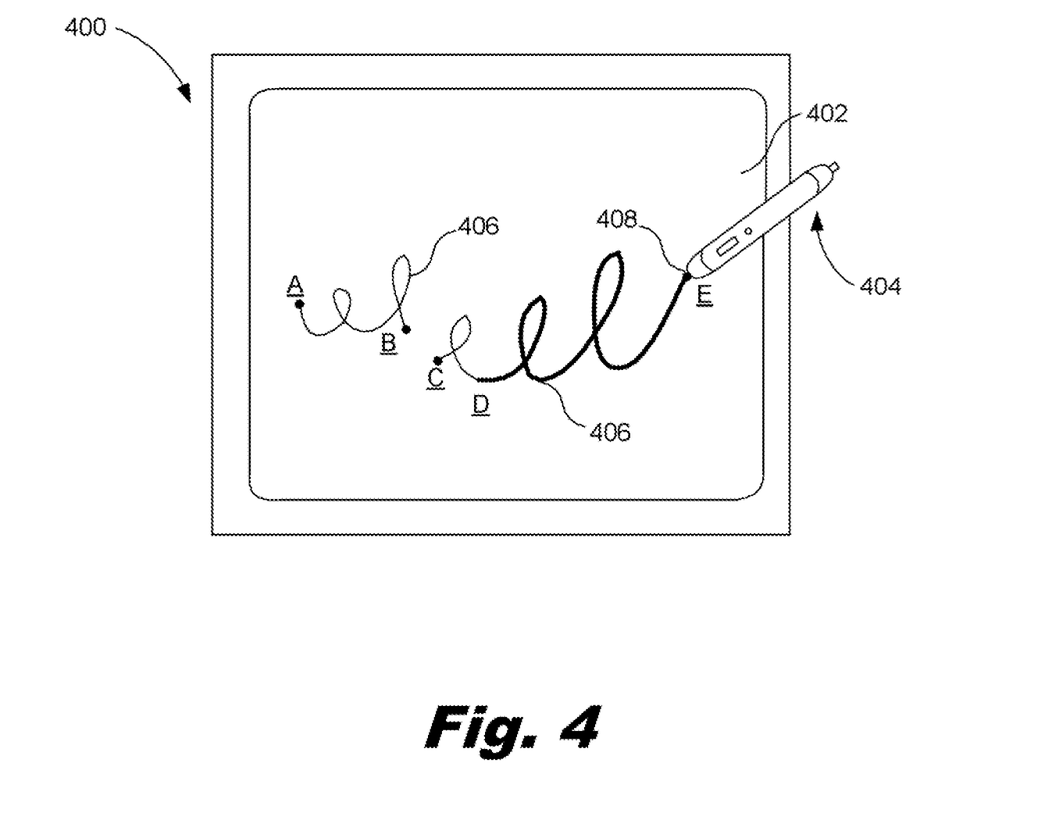
FIG. 4 is a screenshot illustrating transitions of applied force levels on the stylus and the resulting change of line characteristics being drawn with the inventive stylus according to one example of the principles described herein.
Figure 5:
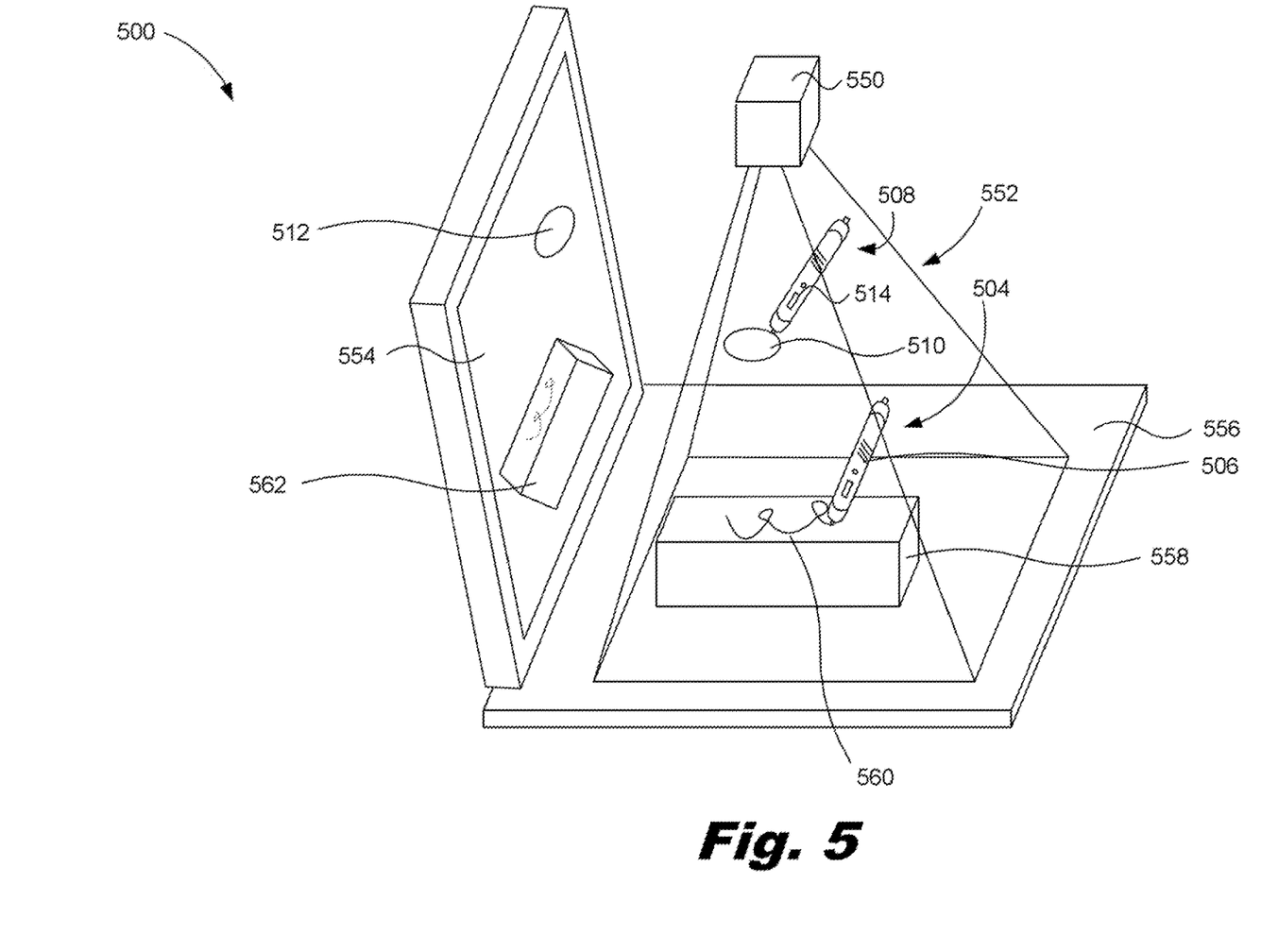
FIG. 5 is a perspective view of the inventive stylus being used to annotate a three dimensional object and a circle in open three-space according to one example of the principles described herein.

Referring now to FIGS. 4 and 5, exemplar styluses of the present invention are illustrated in use with computing devices. In general, computing devices considered herein include any type of computing device to receive input from a stylus, such as, but without limitation, a tablet computer, a convertible notebook or laptop computer, a personal digital assistant, a drawing tablet, a gaming device or other similar devices. More specifically, a computing device as considered herein may include any device having a touchscreen interface for data input. In addition, the stylus of the present invention may be advantageously used with projection capture devices used in conjunction with three-dimension scanning equipment. Use of the inventive stylus with touchscreen and projection capture systems is described with reference to FIGS. 4 and 5 in more detail below.

Referring to FIG. 4, a computing device (400) having a touchscreen (402) is illustrated. The touchscreen may be a capacitance-type touchscreen to receive inputs that are communicated to a processor or other electronic device. A capacitance-type touchscreen enables the computing device to accurately track the location of the tip of a stylus in operative, engagement with the touchscreen. The touchscreen is not, however, able to accurately detect the force applied to the touchscreen by the stylus or after the characteristics of a line or drawing being made by a stylus on the touchscreen. This inventive stylus addresses this drawback by detecting the magnitude of the force at the tip of the stylus and communicating that information to the computing device—e.g., the touchscreen or processor in communication therewith.

For example, a stylus (404) is illustrated drawing a line (406) on the surface of the touchscreen (402). The stylus (404) includes a tip-switch (408), such as the tip-switch described above with reference to FIGS. 1 and 2. The stylus draws the line (406) across the surface of the touchscreen (402), starting from a first point (406A) and terminating at a fifth point (406E). At the first point (406A), the control circuitry in the stylus detects a first magnitude or level of force and, following encoding of the force level, transmits the encoded data to the computing device. The computing device responds by generating a line-width corresponding to the first magnitude or level of force, as indicated in FIG. 4 between in the line (406) drawn between the first point (406A) and the second point (406B).

At the second point (406B), the stylus (404) and, more specifically, the tip-switch (408), are removed from the surface of the touchscreen (402). Removal of the tip-switch (408) from the surface of the touchscreen (402) causes the tip-switch (408) to lose electrical connection with the PCB (e.g., PCB (118) or PCB (318) in FIGS. 1 and 3). The control circuitry detects the loss of electrical connectivity and interprets such as a removal of the stylus from the touchscreen. The control circuitry encodes this information and transmits the data to the computing device. The computing device responds by generating no line width between the second point (406B) and the third point (406C). Alternatively, the stylus (404) (or tip-switch (408)) need not be physically removed from the touchscreen for the computing device to be instructed not to draw a line. Rather, a threshold value of the magnitude of the force level detected by the control circuitry can be set, below which value no line will be generated, even though the stylus (404) remains in contact with the touchscreen and a small, but below threshold, force is applied to the tip-switch (408).

At the third point (406C), sufficient force is reapplied to the tip-switch (408) to once again cause the computing device to generate a line width corresponding to the magnitude of the applied force. As indicated in FIG. 4, the line-width starting at the third point (406C) is the same as the line-width between the first point (406A) and the second point (406B), indicating the magnitude of the applied force placed on the tip-switch (408) is the same in both regions of the line drawing. At the fourth point (406D), an abrupt increase in the force applied to the tip-switch (408) is indicated by an abrupt increase in the line-width. The increased line-width extends to the fifth point (406E).

The line (406) appearing in FIG. 4 is illustrated and described as having abrupt changes in line-width. The first abrupt change occurs at the second point (406B), where the line-width changes from a first width, corresponding to a first applied force level, to no width or line at all, corresponding to either a below threshold value of applied force or stylus removal. The second abrupt change occurs at the third point (406C), which is the reverse of the first change. The third abrupt change occurs at the fourth point (406D), where the line-width increases substantially from the first line-width. The abrupt change in line-width at the fourth point (406D) results from an abrupt increase in the force applied to the tip-switch (408).

In an alternative example (not illustrated), the line-width increases or decreases gradually, as a function of applied force at the tip-switch, rather than abruptly. Gradual increase or decrease in line-width as a function of the applied force (in addition to abrupt increase or decrease) is enabled by proper discretization of the applied force level detected and transmitted by the control circuitry. For example, a tip-switch suitable for the present invention can detect applied force levels between zero grams to approximately 400 grams. The control circuitry can be programmed to encode the applied force data using 8-bit words, which would discretize the 400 gram range into 256 increments. Conversely, 3-bit words would permit only 8 increments. In either case, the incremental force levels may be encoded and transmitted to the computing device using any standard technique, such as frequency, phase or amplitude shift keying, or any other standard coding means.

Referring now to FIG. 5, the inventive stylus is illustrated in use with a projection capture-type computing device or system. For example, a projection capture system (500) is illustrated being used in conjunction with a stylus (504) incorporating several of the principles of the present invention. The system includes an infrared camera or depth sensor (550) that provides an interactive workspace (552) The infrared camera or depth sensor (550) is operatively coupled to a viewing screen (554) such that two-dimensional (e.g., photographs or documents) or three-dimensional objects placed on a work surface (556) are reconstructed and their images generated and illuminated n the viewing screen (554). In one example of the present invention, the stylus (504) is covered, either completely or partially, with a retro-reflective coating (506). The retro-reflective coating (506) enables the infrared camera or depth sensor (550) to track the position of the stylus (504) within the interactive workspace (552). An accelerometer may also be used in the stylus to adjust for fine position movements of the stylus that are too coarse for the infrared camera or depth sensor to track accurately.

Still referring to FIG. 5, a three-dimensional object (558) is shown placed on the work surface (556). The stylus (504) is illustrated drawing a line (560) on the surface of the object (558) in a similar fashion to that described above. The infrared camera or depth sensor (550) is used to reconstruct an image (562) of the object (558) and line (560) on the viewing screen (554). In a further example, the a stylus of the present invention may be used to annotate lines or drawings in any location within the interactive workspace (552); the line or drawing need not be performed directly on an object. For example, a second stylus (508) is illustrated drawing a circle (510) inside the interactive workspace (552). An image (512) of the circle (510) is generated in similar fashion as described above through use of the infrared camera of depth sensor (550) and shown on the viewing screen (554).

One notable difference in annotating a line or drawing in three-space, away from the surface of an object or touchscreen, is the need to activate the stylus other than through direct contact with the tip-switch. In this event, a manual switch (514) (manual switch (108) in FIGS. 1 and 2) is employed as an override to the tip-switch. More specifically, when a user of the stylus desires to annotate in three-space without the stylus (or tip-switch) making contact with an object, the user closes (or activates) the manual switch (514). Overriding the tip-switch using the manual switch (514) enables the control circuitry within the stylus (508) to encode and transmit a signal corresponding to an override applied force level to the computing device. This feature enables the computing device to generate an image of the stylus (or tip-switch) location without the tip-switch having been activated through contact with an object. The manual override switch and control circuitry signals to the computing device to image different line-widths or even colors by, for example, toggling the switch using pre-determined sequences.

Figure 6:
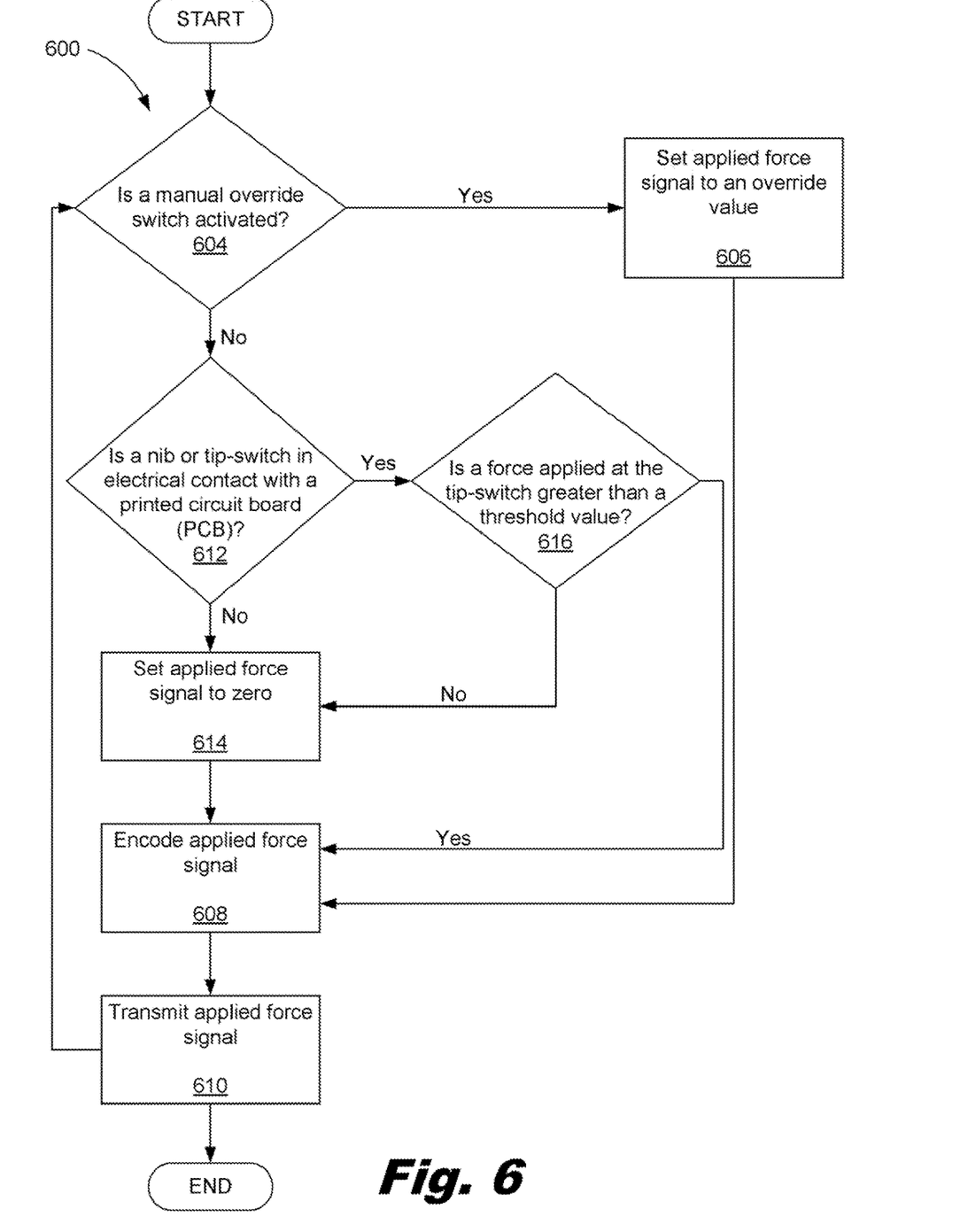
FIG. 6 is a flowchart illustrating logic steps used in one example of the inventive stylus according to one example of the principles described herein.

Referring now to FIG. 6, a flowchart (600) illustrates an exemplar set of logic steps that may be used to determine the status of a tip-switch or manual override switch using the principles of the present invention. Those skilled in the art will recognize that several of the steps may be interchanged, combined or altered to achieve similar functionality. The sequence of exemplar steps commences or starts (602) upon powering on the computing device and stylus. A first query (604) is whether the manual override switch is activated. If the manual override switch is activated, then the control circuitry sets the applied force signal to an override value (606). As described above, the override value may be set to one of several values based on an activation sequence of the manual override switch. Once the signal level is set, the signal is encoded (608) and then transmitted (610) to the computing device. The sequence of steps then returns to the first query (604) and repeats until the first query determines the manual override switch is open or no longer activated.

If the manual override switch is open, the sequence proceeds to a second query (612). The second query (612) is whether the nib or tip-switch is in electrical contact with the PCB as described above. If no contact is detected, the applied force signal is set to zero (614) and then encoded (608) and transmitted (610). If contact is detected, the control circuitry queries (616) whether the applied force at the tip-switch is greater than a threshold value. If the applied force is less than or equal to the threshold value, then, as with the no-contact situation, the signal is set to zero, encoded and transmitted. If the applied force is greater than the threshold value, then the detected applied force level is encoded (608) and transmitted (610). As stated above, the signal representing the applied force level (either detected or manually set) can be discretized as coarsely or finely as desired and encoded using standard techniques for transmission to the computing device.

Figure 7:
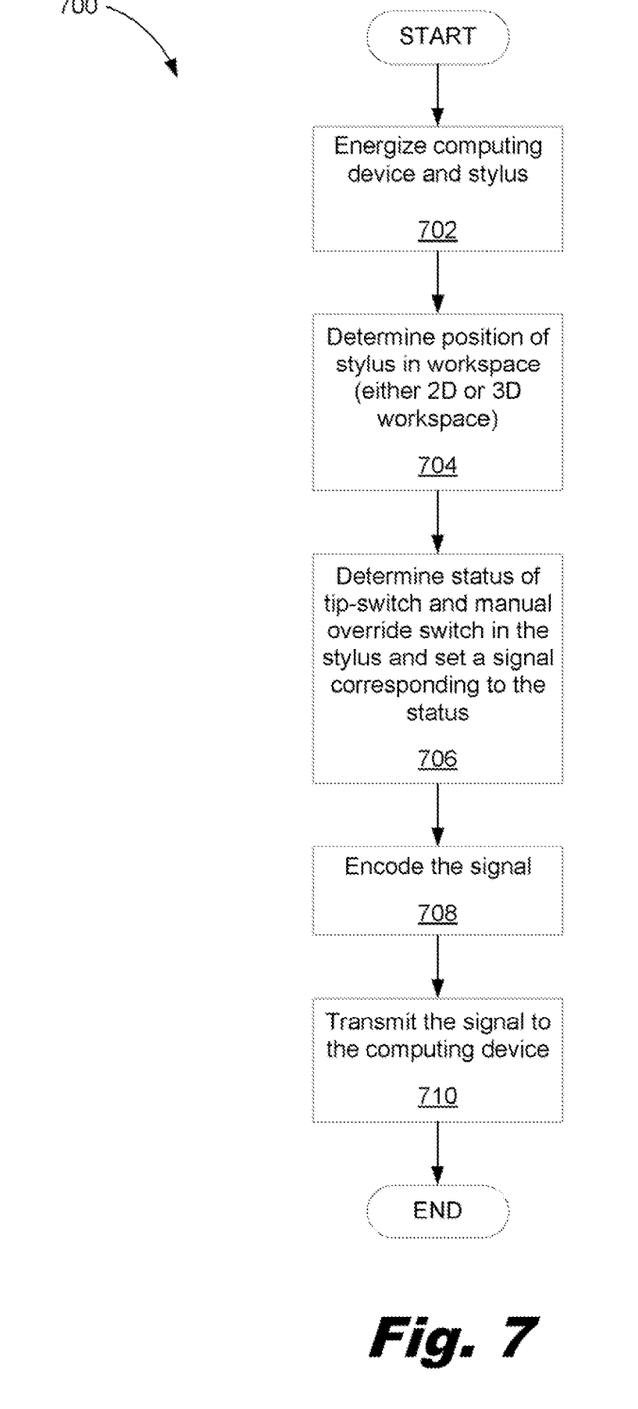
FIG. 7 is a second flowchart illustrating logic steps used in one example of the inventive stylus according to one example of the principles described herein.

Referring to FIG. 7, a more general sequence of exemplar steps (700) illustrates a method using the principles described above. The first step is to energize (702), if not previously energized, the computing device and the stylus. The second step determines the position of the stylus in the workspace (704), which may be either a two- or three-dimensional workspace. The third step determines the status of the tip-switch and manual override switch and to set the signal corresponding to the status (706). The fourth and fifth steps encode the signal (708) and transmit the encoded signal to the computing device (710), respectively. In one example, the steps described in reference to FIG. 6 may be used to accomplish the more general sequence of steps just described with reference to FIG. 7.

Figure 8:
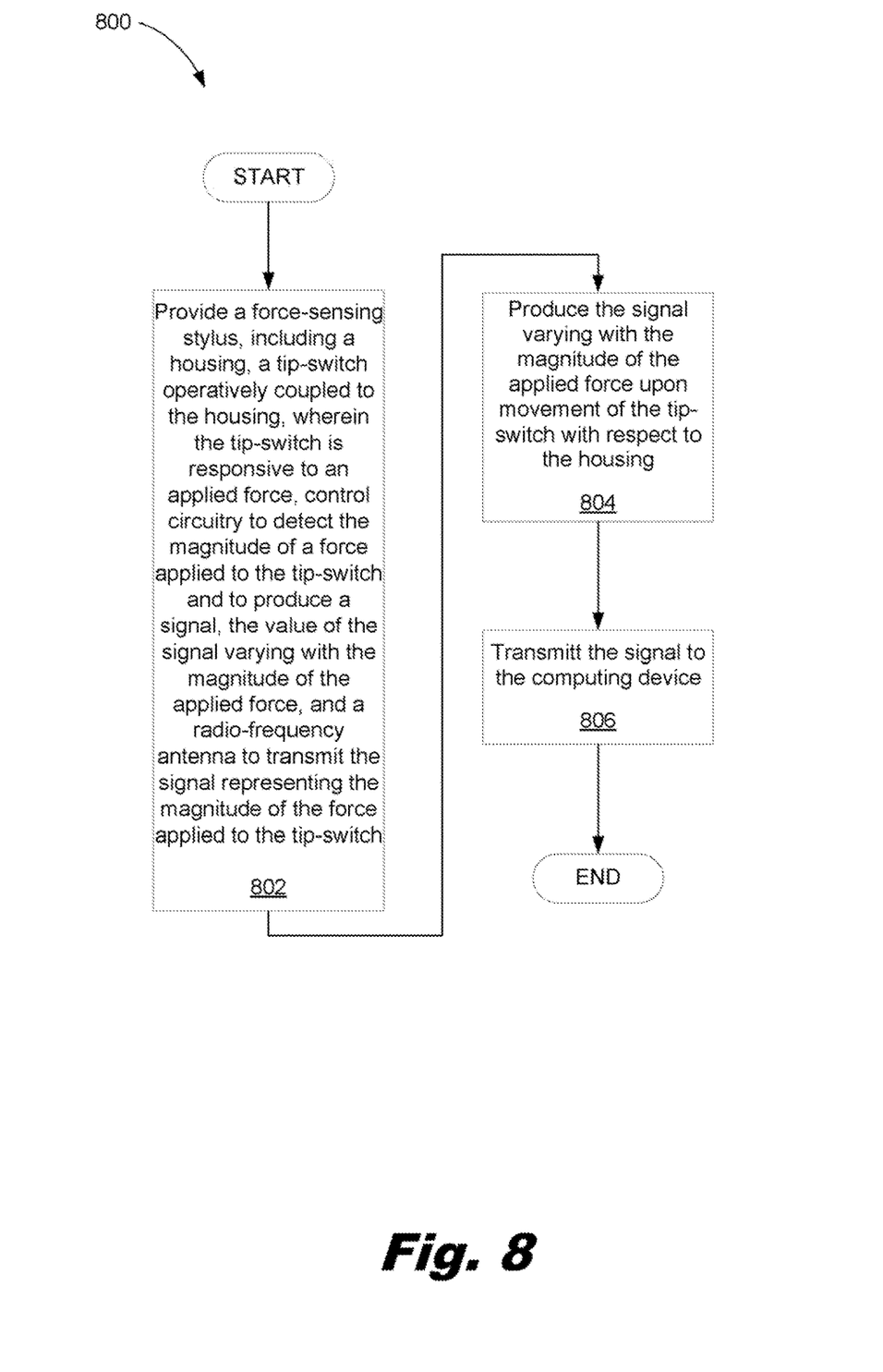
FIG. 8 is a third flowchart illustrating logic steps used in one example of the inventive stylus according to one example of the principles described herein.

Referring to FIG. 8, a sequence of exemplar steps (800) illustrates a method for sensing a force applied to the tip of a stylus and providing a signal to a computing device representative of the magnitude of the force. The method commences by providing a force-sensing stylus having a housing, a tip-switch operatively coupled to the housing, wherein the tip-switch is responsive to an applied force, control circuitry to detect the magnitude of a force applied to the tip-switch and to produce a signal, where the value of the signal varies with the magnitude of the applied force, and a radio-frequency antenna to transmit the signal representing the magnitude of the force applied to the tip-switch (802). A signal varying with the magnitude of the applied force upon movement of the tip-switch with respect to the housing is then produced (804) and the signal transmitted to the computing, device (806). The force-sensing stylus may further include a manual switch to override the tip-switch, wherein the stylus becomes operable when no force is applied to the tip-switch. Further, the housing may include an outer surface, at least a portion of which is retro-reflective for location detection. An accelerometer attached to or within the housing may also be used to refine position determinations of the stylus in at least two dimensions. In addition, the control circuitry may be used to detect a threshold level of the magnitude of the force applied to the tip-switch.

The stylus and tip-switch combination described above is useful in many situations. One situation concerns remote conferencing for collaborative user interaction. In such situations, computing devices (not necessarily the same devices) may be positioned remotely and connected via the Internet or a local intranet. Objects, or the two- or three-dimensional space about the object, may be annotated and the annotations shared with remote users in real time. The combination also permits simple two- or three-dimensional drawing or annotation, either on or off the surface of an object. The drawings or annotations may be stored for later use of forwarded to others, e.g., via email. Another advantage is the combination provides an accurate coordinate measurement machine for use in taking measurements coordinate positions of specific locations on an object.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A stylus for use with a computing device, comprising:
   a housing;
   a tip-switch operatively coupled to the housing, wherein the tip-switch is responsive to a first applied force;
   control circuitry to detect the magnitude of the first applied force to the tip-switch and to produce a signal;
   an accelerometer to detect movement of the stylus in three dimensions;
   a manual switch to override the tip-switch, wherein:
      in response to activation of the manual switch, the control circuitry is to set the signal to an override value such that the stylus becomes operable to enter user input even with no force applied to the tip-switch;
      the override value indicates an override applied force; and
      movement of the stylus in three-dimensional space during activation of the manual switch causes the accelerometer to detect the movement of the stylus in three-dimensional space and input to the computing device as writing with the stylus; and
   an antenna to transmit the signal representing the magnitude of one of the first applied force and the override applied force to the computing device.

2. The stylus of claim 1, wherein the housing has an outer surface, at least a portion of which is retro-reflective.

3. The stylus of claim 1, wherein the control circuitry is operable to detect a threshold level of the magnitude of the first applied force to the tip-switch.

4. The stylus of claim 1, further comprising an indicator light to indicate that the manual switch is activated.

5. The stylus of claim 1, further comprising a second tip-switch at a second end of the housing.

6. The stylus of claim 1, wherein the tip-switch comprises a piezoelectric electrical contact portion.

7. A force sensitive stylus for use with a computing device, comprising:
   a housing;
   a printed circuit board disposed within the housing;
   a tip-switch operatively coupled to the housing, wherein:
      the tip-switch is responsive to a first applied force; and
      a contact portion of the tip-switch is spaced apart from the printed circuit board;
   control circuitry to detect the magnitude of the first applied force to the tip-switch and to produce a signal, the value of the signal varying with the magnitude of the applied force;
   an accelerometer to detect movement of the stylus in three dimensions;
   a manual switch mounted on the printed circuit board, the manual switch to override the tip-switch, wherein:
      in response to activation of the manual switch, the control circuitry is to set the signal to an override value such that the stylus becomes operable to enter user input even with no force applied to the tip-switch;
      the override value indicates an override applied force;
      the override value is set based on an activation sequence of the manual switch; and
      the control circuitry encodes the movement of the stylus in three-dimensional space into writing with the stylus based on detected movement by the accelerometer; and
   an antenna to transmit the signal representing the magnitude of one of the first applied force and the override applied force to the computing device.

8. The stylus of claim 7, wherein the housing has an outer surface at least a portion of which is retro-reflective.

9. The stylus of claim 8, wherein the accelerometer refines position determinations of the stylus in at least two dimensions.

10. The stylus of claim 9, wherein the control circuitry is operable to detect threshold level of the magnitude of the first applied force to the tip-switch.

11. The stylus of claim 7, wherein the magnitude of the first applied force ranges from approximately zero to approximately 400 grams.

12. The stylus of claim 7, wherein the contact portion of the tip-switch is biased away from the printed circuit board.

13. A method for sensing a force applied to a tip of a stylus and providing a signal to a computing device representative of a magnitude of the applied force, comprising:
   providing a force-sensing stylus, comprising:
      a housing;
      a tip-switch operatively coupled to the housing, wherein the tip-switch is responsive to applied force;
      control circuitry to detect the magnitude of the applied force applied to the tip-switch and to produce the signal, a value of the signal varying with the magnitude of the applied force;
      an accelerometer to detect movement of the stylus in three dimensions; and
      a manual switch to override the tip-switch to activate the stylus when no force is applied to the tip-switch;
   producing the signal varying with the magnitude of the applied force upon movement of the tip-switch with respect to the housing;
   in response to activation of the manual switch:
      setting the signal to an override value of multiple override values based on an activation sequence of the manual switch, wherein the override value indicates an override force;

with the control circuitry, encoding the movement of the stylus in three-dimensional space into writing with the stylus based on detected movement by the accelerometer; and transmitting the signal representing the magnitude of one of the applied force and the override force to the computing device.

14. The method of claim 13, wherein the housing has an outer surface, at least a portion of which is retro-reflective.

15. The method of claim 13, wherein the accelerometer refines position determinations of the stylus in at least two dimensions.

16. The method of claim 13, wherein the control circuitry is operable to detect a threshold level of the magnitude of the applied force to the tip-switch.

17. The method of claim 13, comprising:

in response to a determination that the manual switch has not been activated, determining whether the tip-switch is in electrical contact with a printed circuit board (PCB);

in response to a determination that the tip-switch is in electrical contact with the PCB, determining whether the applied force is greater than a threshold value.

18. The method of claim 17, comprising:

in response to a determination that the applied force is greater than a threshold value, encoding the signal;

in response to a determination that the applied force is not greater than the threshold value, setting the signal to zero.

19. The method of claim 17, comprising in response to a determination that the tip-switch is not in electrical contact with the PCB, setting the signal to zero.

20. The method of claim 13, further comprising altering a characteristic of a line based on the activation sequence of the manual switch.

* * * * *